United States Patent [19]
Adams

[11] 3,747,269
[45] July 24, 1973

[54] ARTIFICIAL HOLDER FOR A FLORAL ACCESSORY

[76] Inventor: Jerry Adams, 1443 Homestead Rd., Lagrange, Ill.

[22] Filed: Dec. 8, 1971

[21] Appl. No.: 205,988

[52] U.S. Cl. .................................. 47/55, 161/21
[51] Int. Cl. ......................... A01g 5/00, A41g 1/00
[58] Field of Search ................. 47/55; 161/21, 26, 161/28, 30

[56] References Cited
UNITED STATES PATENTS

| | | | |
|---|---|---|---|
| 2,390,858 | 12/1945 | Walker | 47/55 |
| 2,593,797 | 4/1952 | Robbins | 47/55 |
| 3,597,879 | 8/1971 | Gallo | 47/55 |

Primary Examiner—Robert E. Bagwill
Attorney—Augustus G. Douvas

[57] ABSTRACT

An artificial holder for a floral accessory comprising an elongated floral stem reinforced by a semi-rigid flexible element, such as a wire core. A pair of floral accessory clamping jaws are supported by the stem. The jaws are fabricated from a pliable material with the wire core extending into the body of at least one of the jaws. The adjacent mating surfaces of the jaws are coated with an adhesive layer which enables the jaws to clamp fixedly a floral accessory sandwiched between the jaws. A paper release W-shaped loop or an alternative release board is provided for the storage of the holder prior to its use.

10 Claims, 7 Drawing Figures

PATENTED JUL 24 1973
3,747,269
FIG-1 FIG-2 FIG-3 FIG-4 FIG-5 FIG-6 FIG-7
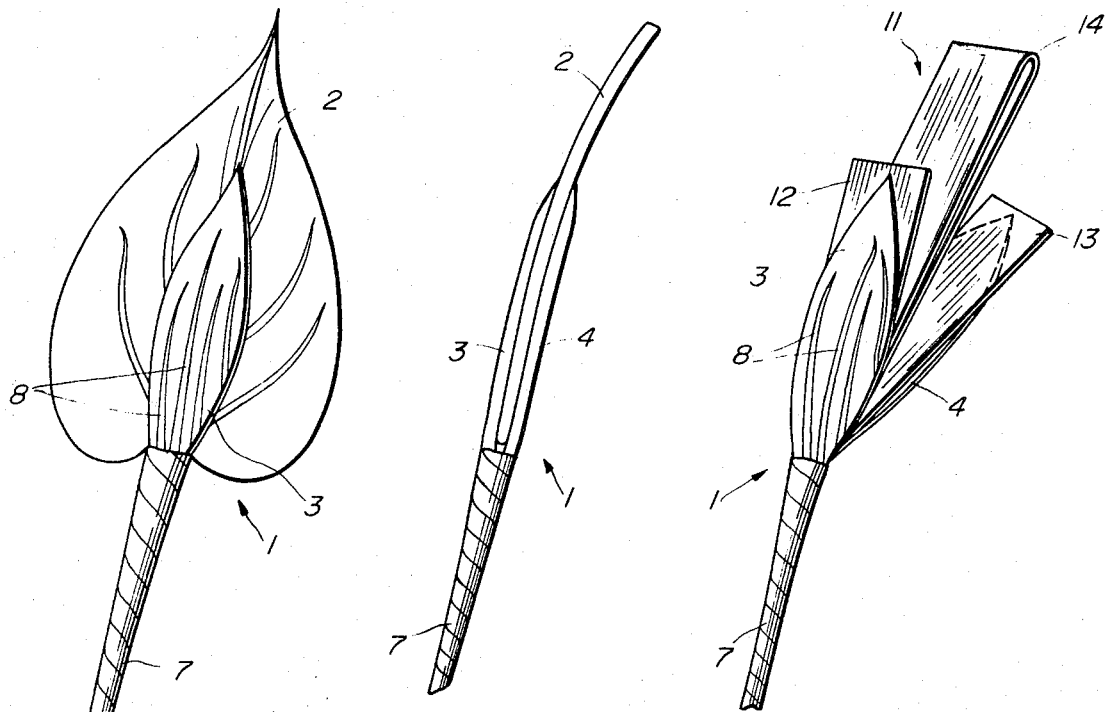
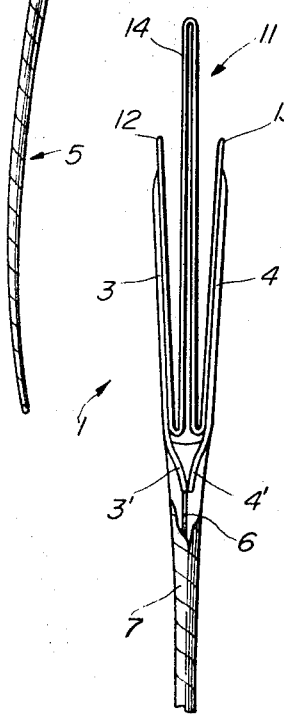
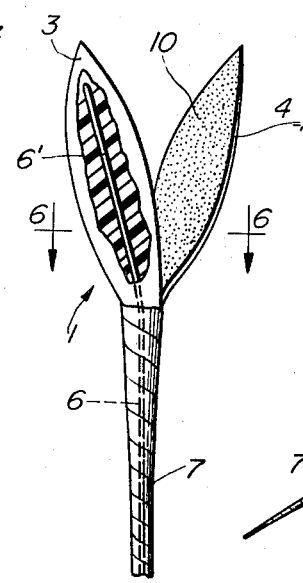
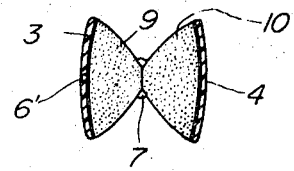
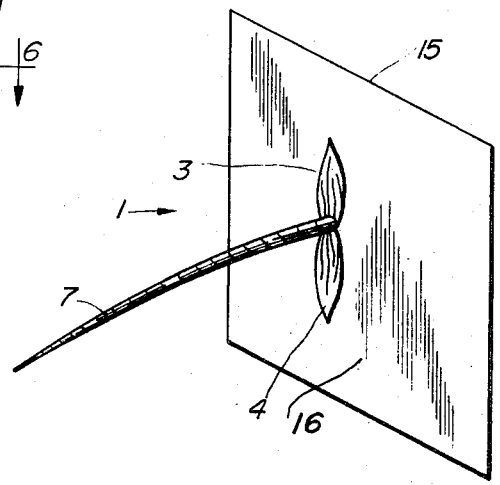

{{REF:3,747,269}}

ARTIFICIAL HOLDER FOR A FLORAL ACCESSORY

DESCRIPTION OF THE PRIOR ART

U.S. Pat. No. 3,597,879 discloses a flower-petal holder employing a fastener, such as a staple, for supporting a petal in an artificial stem; and U.S. Pat. No. 2,249,567 shows a metallic clamp having a plurality of prongs to engage a leaf or flower.

U.S. 2,390,858 shows a floral accessory having two adhesively coated discs for clamping a plurality of leaves generally horizontally and normal to the supporting stem.

SUMMARY OF THE INVENTION

A principal object of this invention is to provide an artificial holder for a floral accessory which is natural in appearance and relatively easy to apply to a floral accessory. This object is attained by the attachment of a pair of adhesive-coated pliable clamping jaws to a floral stem. Because of the use of an adhesive in the manner to be described, all of the exposed elements of the holder may be fabricated in a form, color and texture to simulate closely a natural flower stem.

Another object of this invention is to provide a holder which will enable a supported floral accessory to be readily adjusted in a floral arrangement to provide a desired appearance. This object is attained by extending the wire core of the holder stem into at least one jaw. The semi-rigid and flexible characteristics of the wire nonetheless enable the pliable jaw pair to be formed and bent into a desired contour and attitude.

Another object of the invention is to provide a holder which is completely unitary in that it may be removed from a stored environment and manually applied in the making of a floral arrangement without the use of tools or additional parts.

DETAILED DESCRIPTION OF THE DRAWINGS

In order that all of the structural features for attaining the objects of this invention may be understood, reference is herein made to the accompanying drawings wherein:

FIG. 1 is a front view of the artificial holder of this invention supporting a leaf;

FIG. 2 is a side view of the structure of FIG. 1;

FIG. 3 is a perspective of the artificial holder of the invention with a paper release loop applied to the adhesive surfaces of the holder jaws;

FIG. 4 is a side view of the structure of FIG. 3 with a portion of the wrapping tape broken away;

FIG. 5 is a perspective view of the holder of the other views with release loop removed and with a portion of one jaw broken away to show the embedded wire core;

FIG. 6 is a section view taken along line 6—6 of FIG. 5; and

FIG. 7 is a perspective view showing the storage of a single holder on a planar release board.

DETAILED DESCRIPTION OF THE INVENTION

In FIGS. 1 and 2 of the drawings, the artificial holder 1 of this invention is shown typically supporting a leaf 2 between clamping jaws 3 and 4 of the holder. Leaf 2 is merely illustrative of the many natural and synthetic floral accessories, such as petals, flowers, and ornaments to which the artificial holder of this invention may be applied.

Holder 1 includes a stem 5 which in a preferred embodiment, includes a semi-rigid, flexible core 6 (see FIGS. 4 and 5). Core 6 may be a metallic wire around which a decorative and colored floral tape 7 may be helically wrapped. Tape 7 completely envelopes wire 6 with the wrapping terminating above the lower portions 3' and 4' (FIG. 4) of jaws 3 and 4, respectively. Accordingly, tape 7 binds the lower jaw portions 3' and 4' one to the other in a manner so as to form a hinge in the general juncture area.

Wire 6 extends through the entire shank length of stem 5. The wire also projects into the body of at least one jaw, jaw 3 for example, as is shown in FIG. 5. The jaws 3 and 4 may be typically fabricated of a pliable material such as a plastic or a fabric. The upper portion 6' (FIG. 5) of wire core 6 is preferably embedded within a single jaw 3 so as to lend rigidity to at least one of the jaws. This jaw rigidity is highly desirable when the jaws are in the clamping position as is shown in FIGS. 1 and 2, because in this position it is possible to bend the jaws so as to hold leaf 2 or any other supported floral accessory in a desired position within the overall floral arrangement.

Jaws 3 and 4 may, of course, be fabricated in any of several configurations which will enhance the overall appearance of the floral display. In the particular embodiment shown in the drawings, the jaws have a peripheral outline generally similar to that of a single point leaf with embossed veins 8 appearing of the surface of each of the jaws 3 and 4.

As is shown in FIGS. 5 and 6, the inside mating surfaces of jaws 3 and 4 are coated with a thin layer of adhesive 9 and 10. The particular adhesive employed may be any of the types commercially available which will adhere to natural floral substances or synthetic elements which may be inserted between jaws 3 and 4.

In order to prevent the adhesive layers 9 and 10 from joining jaws 3 and 4 to one another prior to the insertion of a leaf 2 or other floral accessory, it is necessary to employ a release element. In FIGS. 3 and 4, a wax-like paper release element 11 which is W-shaped in cross section and which element includes sides 12 and 13 affixed to adhesive layers 9 and 10 and a central elongated loop 14 is shown.

In view of the fact that loop 14 projects beyond jaws 3 and 4, this loop extension is readily available for manual pulling of the entire release element from holder 1. When the release element is removed from the holder, adhesive surfaces 9 and 10 of jaws 3 and 4 are exposed and therefore leaf 2, for example, may be inserted between the jaws. The adhesive surfaces retain leaf 2 tightly between the jaws of the holder and the presence of wire portion 6' (FIGS. 5, 6) within jaw 3 enables the jaw combination 3, 4 to be bent into any desired positioning.

FIG. 7 shows a single artificial holder 1 applied to release board 15. The planar surface 16 of release board 15 to which jaws 3 and 4 are to be applied, contains a wax-like substance which will prevent the adhesive layers 9, 10 from permanently adhering thereto. Accordingly, holder 1 may be manually pulled from release board 15 thus exposing adhesive surfaces 9 and 10 for application to a leaf 2 in the manner shown in FIGS. 1 and 2.

It should be understood that the above described structure is merely illustrative. Modifications can obviously be made in the holder and release means shown without departing from the scope of the invention. For example, jaws 3, 4 and floral tape 7 (or other core covering) may be integrally molded as a single plastic unit with the core therein. Thus, the assembly of separate jaw components with a separate core covering can be avoided. Also, the paper release element 11 can be eliminated if adhesive layers 9, 10 are of an adhesive material which require a liquid to be applied thereto, such as water, before the layers are activated for adhesion to a leaf or the like. Alternatively, adhesive layers 9, 10 and the release element 11 can all be eliminated if the adhesive is applied to the leaf areas which are to make contact with the jaws 3, 4.

What is claimed is:

1. An artificial holder for a floral accessory comprising an elongated floral stem reinforced by a semi-rigid flexible element, a pair of floral accessory clamping jaws fabricated of pliable material with both jaws hinged to and supported by the stem and with at least one jaw reinforced and supported by the flexible element, said element being at least partially embedded in said jaw, and an adhesive material applied to adjacent mating surfaces of the clamping jaws to adhere to opposite sides of a floral accessory located between the jaws with both jaws being manually bendable in the area of the jaws with a floral accessory clamped fixedly therebetween to maintain the floral accessory at a desired attitude and contour relative the stem due to reinforcing of at least one jaw by the flexible element.

2. The artificial holder of claim 1 in which the semi-rigid flexible element comprises a metallic wire core.

3. The artificial holder of claim 2 in which the floral stem comprises a floral tape wrapped around the wire core.

4. The artificial holder of claim 3 in which an end portion of the wire core is unwrapped and this end portion is completely embedded in one of said jaws.

5. The artificial holder of claim 4 in which each of the jaws is generally planar and substantially identical in peripheral outline.

6. The artificial holder of claim 1 in which each of the jaws is generally planar and substantially identical in peripheral outline.

7. The artificial holder of claim 6 in which each of the jaws generally resembles a small leaf in peripheral outline.

8. The artificial holder of claim 1 comprising a removable release element sandwiched between the adhesive surfaces of the clamping jaws and which release element is removed to expose the adhesive surfaces for the subsequent clamping of a floral accessory.

9. The artificial holder of claim 8 in which the removable release element includes a loop of material projecting beyond the jaws for ready manual access.

10. The artificial holder of claim 1 adhered to a generally planar release means to which the adhesive surfaces of the jaws when expanded may be applied for storage of the holder.

* * * * *